United States Patent [19]

Mühlratzer et al.

[11] Patent Number: 4,761,323
[45] Date of Patent: Aug. 2, 1988

[54] METHOD AND ARTICLE FOR THE PRODUCTION OF POROUS FIBER BATS

[75] Inventors: August Mühlratzer, Krailling; Siegfried Lassmann, Gröbenzell; Roland Bertinger, Munich; Herbert Gutwein, Pasenbach; Renate Sanden, Hebertshausen, all of Fed. Rep. of Germany

[73] Assignee: Man Technologie GmbH, Munich, Fed. Rep. of Germany

[21] Appl. No.: 917,804

[22] Filed: Oct. 10, 1986

[30] Foreign Application Priority Data

Nov. 13, 1985 [DE] Fed. Rep. of Germany ....... 3540133
Jul. 15, 1986 [DE] Fed. Rep. of Germany ....... 3623786

[51] Int. Cl.⁴ ............................................ B32B 27/14
[52] U.S. Cl. ................................... 428/198; 156/62.2; 427/249; 427/255; 427/344; 427/434.2; 427/443.2; 428/280; 428/281; 428/360; 428/368; 428/224; 428/408; 55/512

[58] Field of Search .............. 156/62.2; 427/249, 255, 427/434.2, 443.2, 343, 344; 428/198, 280, 281, 360, 368, 221, 224, 408; 55/512

[56] References Cited

U.S. PATENT DOCUMENTS

| 3,011,929 | 12/1961 | Statego | 428/360 |
| 3,101,845 | 8/1963 | Heasley | 428/360 |
| 4,396,663 | 8/1983 | Mitchell et al. | 428/360 |
| 4,410,585 | 10/1983 | McLoughlin | 428/360 |

*Primary Examiner*—James J. Bell
*Attorney, Agent, or Firm*—Roberts, Spiecens & Cohen

[57] ABSTRACT

A method for the production of soot filters using felt-like or other bats as filter elements, which are made up of loose refractory fibers. In order to bond the fibers together and to anchor then in place, the filter element made up of the fibers is coated by CVD or precipitation from a solution to give an amorphous coating. The coating is also refractory. It bonds the fibers together at their crossovers.

7 Claims, 3 Drawing Sheets

METHOD AND ARTICLE FOR THE PRODUCTION OF POROUS FIBER BATS

BACKGROUND OF THE INVENTION

The invention relates to a method for the production of porous fiber bats of coiled or loose fibers put into the form of a felt- or wadding-like structure, in which they are brought into contact with an agent for joining the fibers together.

The German unexamined specification No. 2,750,960 describes the use of bats as filters for diesel exhaust gas. The fiber felt consisting of loose fibers is for this purpose surrounded with support members and on the downstream side is additionally provided with woven fiber pads in order to prevent the gas flow from dislodging the loose fibers. However it is still not possible to prevent some of the fibers being entrained by the current of gas and being deposited on the upstream side of the woven pad and even becoming lodged in its pores.

However it has been shown that fiber bats have valuable properties, more especially for filtration, since it is possible for over 90% of the suspended particles to be retained thereby, but on the other hand the working life of the material and the permanence of the porosity have been found not to be satisfactory.

Therefore attempts have been made to take suitable steps to integrate the fibers in a durable and strong structure.

The U.S. Pat. No. 3,826,076 describes a method of the initially mentioned type in which the fibers are compacted and bonded together with a silicate binder. The latter however leads to the formation of lumps and dislodges some of the fibers. The outcome is then that the fibers adhere together along a certain length thereof and the pore size is not uniform from one production batch to the next. This is illustrated in FIG. 3 of the accompanying drawings.

Another attempt at stabilizing the fibers is involved in the method of the German unexamined specification No. 2,155,507 in which bats of agglomerated fiber elements are produced which have a periphery provided with minute whiskers and form numerous interstices between them. In this case the compaction of the fiber cushion is intended not to lead to dense packing or clogging of the interstices. The particle storage capacity is considerably diminished however in this proposal owing to the agglomeration.

Fiber bats made of coiled endless fibers also involve a danger of impairment of the porosity owing to slipping of the relatively loosely coiled fibers.

SUMMARY OF THE INVENTION

One object of the invention is to devise a method of the intitially mentioned type in which fiber bats may be produced with a porosity that is consistent from one batch to the next and may be varied at will, i.e. so that the degree of porosity is reproducible.

In order to achieve this or other aims, in the present invention the fibers of the fiber bat are so coated with the bonding agent that the fibers are connected together substantially exclusively at the fiber crossovers by the said agent.

In this method the fibers are not separately coated as separate fibers but within the fiber bat so that the coating material not only surrounds the individual fibers but also bridges over the fiber crossovers, which are closer together. The consequence of this is that the fibers are joined together at the crossovers by the coating material, whereas the cavities between the fibers are left as such and unimpeded after the coating operation.

This constitutes a simple way of securing the loose fibers within the fiber member so that they will not be squeezed together or dislodged from the felt structure when the fiber member is employed for an exhaust gas filter, for example. The efficacy of the filter functioning as a deep filter and made up of loose fibers, which is determined by the size and distribution of the spacing between the fibers and the interstices, is thus maintained when subjected to operational loads.

A further advantage of the method in keeping with the invention is that the coating material endows the fibers with a rough surface, as for example by crystallisation of the coating material, with the result that the acting surface for the deposition of soot or other particles is increased in area.

Moreover, the method of the invention increases the mechanical stability of the fiber bat.

The fiber bats are produced from materials selected in accordance with the specific application. It is possible to employ fibers of a single material or of different materials in a bat. It is furthermore possible to so select the fibers that the bat has fibers with a uniform size (i.e. with the same lengths and diameters) or with a non-uniform size.

The application of the layer connecting the fibers may be by deposition of the specific selected material from a gaseous phase (CVD).

A further advantage of this method is that the arrangement of the bat structure, which initially consists of loose or unsecured fibers, is generally not disturbed.

In keeping with a further form of the invention the coating operation may take place in stages, that is to say with one or more pauses so that in each case there is a renewed formation of seeds or nuclei on the fibers. This is useful in the case of certain applications as for example the manufacture of filters, inasfar as the layer then assumes a highly structured or very rough surface.

However it is nevertheless possible to undertake coating by a different method as for instance using impregnation with a solution, precipitation of a solid, and firing the deposit, or by deposition of substances in an amorphous form from the liquid phase by a sol-gel method (Journal of Non-Crystalline Solids, 63 (1984) 237–241, Holland).

In accordance with a further aspect the invention also relates to fiber filters and more especially to soot filters in which fibers are joined together substantially exclusively at their fiber crossovers or intersections.

The invention will now be described in more detail with reference to embodiments as shown in the accompanying drawings.

DETAILED DESCRIPTION OF THE INVENTION

Figure 1:
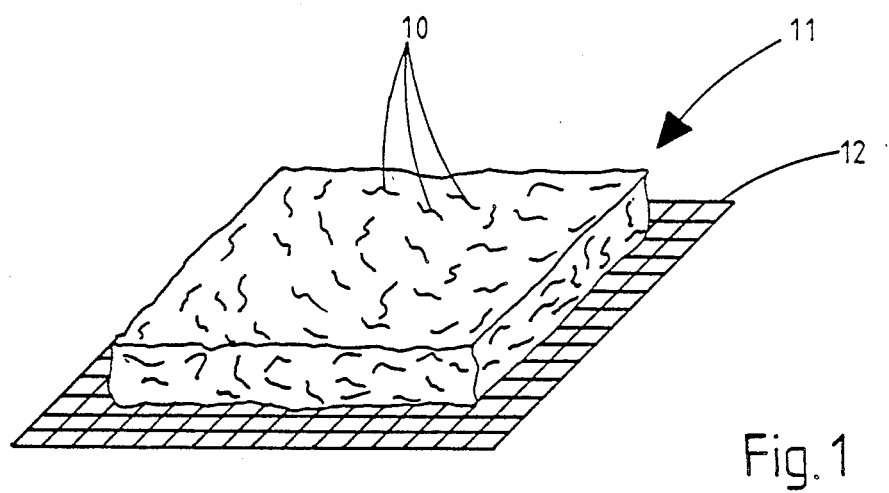
FIG. 1 shows a fiber bat in perspective.

Referring more particularly to FIG. 1, the reader will see a felt- or wadding-like fiber bat 11 made up of loose fibers 10. The fibers 10 are mixed and entangled with each other. The fibers are supported on a coarse mesh support 12 so that the bat 11 may be coated.

Figure 2:
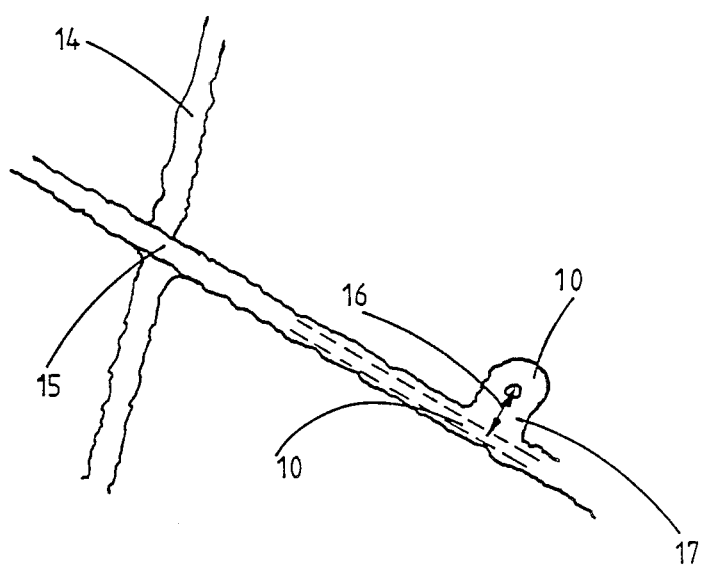
FIG. 2 shows fibers in the bat of FIG. 1 under magnification.
Figure 4:
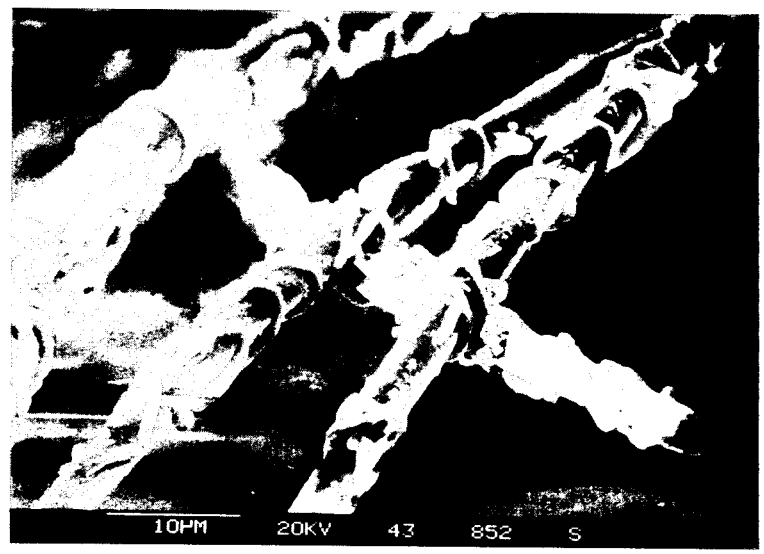
FIGS. 4–6 are microphotographs of the structure of fibers bat manufactured in accordance with the invention.
Figure 5:
Figure 6:
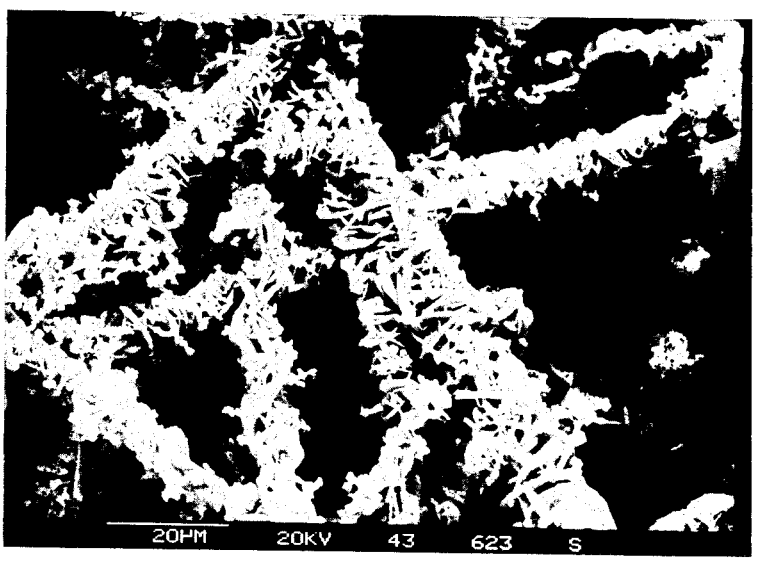

In the CVD method the bat 11 together with the support 12 is placed in a reaction oven whose atmosphere is adapted to produce a layer of the coating material. After a coating period at a raised temperature and lasting from a few minutes to several hours, the coating on the individual fibers will have assumed a thickness of some microns. Crossovers or intersections 15 of the fibers, at which the fiber spacing 16 is at the most equal to twice the thickness of the coating, are so bridged over by the coating material 17 that the fibers are joined together at such points 15 as will be seen on a larger scale in FIG. 2. The microphotographs in FIGS. 4 through 6 show such intersections even more clearly.

The microphotographs further show the crystalline structures or irregular deposits on the fibers which mean that the fibers 14 have a rough surface favoring improved adhesion of the particles, and more especially of the finest ones such as soot or ash particles, if the fiber bat is to be utilized as a filter. The fibers provided with a coating are only bonded at their intersections. The microphotographs 4 to 6 show the products as resulting from examples 2, 3 and 12, respectively.

Figure 3:
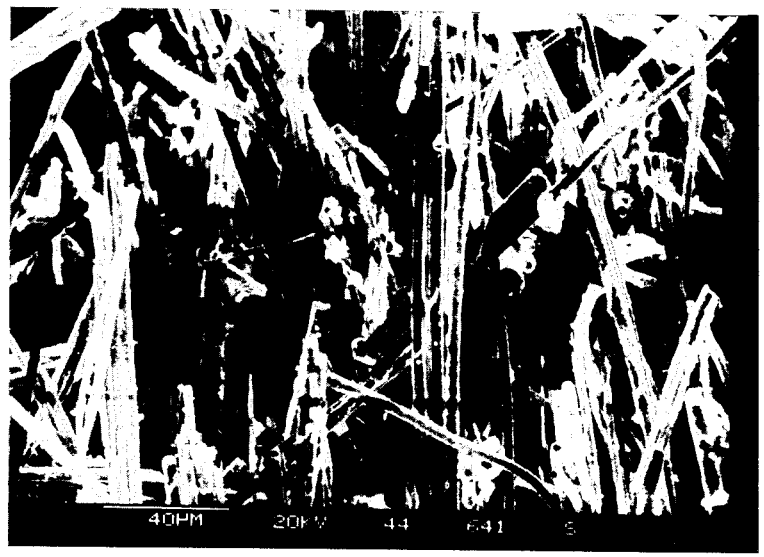
FIG. 3 is microphotograph of the structure of a fiber bat as produced using a prior art method.

FIG. 3 shows a fiber bat as produced by a known method. The fibers tend to be side by side and their sides are bonded or adhered to each other. This is in contrast to the fiber bats produced in accordance with the invention in examples 2, 3 and 12 which are shown in FIGS. 4 through 6 respectively.

The fiber bat 11 may be manufactured by impregnation or wetting of the fibers 10 in a composition constituted by a colloidally suspended coating material so that the fibers are coated. The solid particles are deposited on the fibers and coat them. The excess liquid (sol) is then drawn off. The impregnated fiber material is dried and fired so that the deposited solid is sintered onto the fibers.

The coating of fiber bats made by winding continuous fibers may take place in a similar manner. Such porous wound fiber bats are loosely produced in alternately crossing layers in order to form passages therethrough which constitute the pores. In this case as well the fibers are exclusively joined at the crossovers.

Whatever the particular coating method employed and whatever the structure of the fiber bat, the final product obtained will be a porous member or bat 11 whose porosity is dependent on the packing density of the fibers 10. The shaping of the filter member to give it its final configuration may take place prior to or after coating.

Fiber bats produced by the method of the invention may readily be subsequently treated after coating. Such treatment may for instance include coating with a catalytically active material. The type and duration of the coating operation will depend on the fiber bat selected, its density and the desired porosity. These parameters are generally empirically determined. The examples now to be described of methods of manufacturing fiber bats in accordance with the invention will provide some guidelines as in this respect.

EXAMPLE 1

(a) $Al_2O_3$ fiber wool or alternatively $Al_2O_3$ fiber bat with a mean fiber diameter of 3 microns was mechanically opened using mechanical combs, spread out on a belt and punch loomed so as to produce a non-woven fabric able to be handled and with a substantially random arrangement of the fiber directions. The non-woven fabric had a bulk density under 0.1 g/cc, this being significant for use of the fabric in exhaust gas filters in order to cause minimum back pressure. Lastly, the non-woven fabric was mounted in refractory metal gauze as a filter element with the desired configuration.

(b) The non-woven fabric produced in this manner was then coated with $Al_2O_3$ using the CVD method. The deposition of the $Al_2O_3$ in the interior of the fiber felt involved the conversion of $AlCl_3$ with $CO_2$ and $H_2$. The deposition took place in the following manner.

(c) At a temperature of 850° C. and a process gas pressure of 6 kPa a gas for causing deposition was passed through the fiber material. The gas contained 6.0 mol % $AlCl_3$ and 7.8 mol % $CO_2$, the rest being $H_2$. The overall treatment time amounted to 12 hours. The coating process was interrupted twice in order to cause the formation of new $Al_2O_3$ seeds or nuclei each time the process was restarted so that coating growth in fine crystals took place. The deposit of $Al_2O_3$ caused the $Al_2O_3$ fibers to be completely covered with a layer of fine $Al_2O_3$ crystals with a thickness of approximately 1 micron so that there was a firm attachment to adjacent fibers at all points of contact. The result was then a highly porous and dimensionally stable ceramic structure.

EXAMPLE 2

(a) A fiber non-woven fabric as produced in part (a) of example 1 was utilized and coated in the CVD method as follows.

(b) At a temperature of 950° C. and pressure of 6 kPA the fibers were coated with a gas made up of 6.0 mol % $AlCl_3$ and 7.8 mol % $CO_2$, the rest being $H_2$. In this case the period of $Al_2O_3$ deposition lasted 6 hours. When carried out in this manner, the process led to a more intensely structured surface on the $Al_2O_3$ fibers, which were firmly secured to each other. They are to be seen in the microphotograph of FIG. 4.

EXAMPLE 3

(a) The non-woven fabric as described in example 2, part (a) was employed.

(b) At a temperature of 1050° C. and a pressure of 100 kPa deposition of $Al_2O_3$ was undertaken on the non-woven fabric. The gas contained 2.7 mol % $Al_2O_3$ and 3.5 mol % $CO_2$ with the remainder in the form of $H_2$. By the end of a period of deposition of 4 hours the $Al_2O_3$ fibers were firmly secured by the layer of $Al_2O_3$ which grew on their surfaces with a markedly crystalline form with a large surface area, see FIG. 5.

(c) In a further test with the same physical conditions and the same gas composition but with a period of treatment lasting 12 hours and with four interruptions, sturdy joins were produced at the fiber crossovers using an $Al_2O_3$ coating of approximately 4 microns in thickness. The outcome was a highly porous ceramic member able to withstand substantial mechanical loads.

EXAMPLE 4

(a) Fiber wool of mullite ($Al_6Si_2O_{13}$) with a mean fiber diameter of 3 microns was placed in a high speed agitator to suspend it in a mixture of water with 20% of polyethyleneglycol by volume. To prevent the formation of bubbles and ensuing damage to the fibers during the intensive agitation, the suspension was produced in an evacuated vessel.

(b) The fiber suspension was poured into a double walled tubular vacuum filter funnel and subjected to a vacuum filtering action so that a fiber bat of randomly orientated fibers with a tubular configuration was produced. The polyethyleneglycol retained on the fiber surfaces sufficed to hold the fibers together so that the bat might be handled. As in example 1 the semi-finished fiber bat was mounted in refractory metal gauze and heated to remove polyethyleneglyol on it.

(c) Such semi-finished material was impregnated by the so-called sol-gel method in the following manner and then heat treated to join the fibers together. 10 moles of tetramethyloxysilane ($Si(OCH_3)_4$, i.e. TMOS) were dissolved in 5 l of isopropanol. 30 moles of aluminum tri-secondary-butylate, $Al(O-sec-C_4H_9)_3$ were mixed into this solution. 1 l of 96% ethyl alcohol ($C_2H_5OH$) was added while stirring and heating to this resulting solution. The turbidity initially caused by the addition of the ethyl alcohol disappeared slowly.

(d) The result was clear hydroxide sol in which the fiber members were dipped until fully impregnated. Then most of the sol was drawn off from the fiber member. The residue still adhering to the fibers was dried off in the air so that a dry gel coating was formed on the fibers. Then the coated fiber member was heated in a furnace with forced air circulation in two hour periods at respectively 70°, 200°, 400° and 900° C. so as to reach a final temperature of 1100° C. After a four hours reaction at 1100° C. a firmly adhering coating of practically pure mullite had formed on the fibers so that the latter were firmly joined at their intersections. This mullite coating was finely crystalline and had a large specific surface.

EXAMPLE 5

(a) Disk-like members were made from staple fiber with the composition 62% $Al_2O_3$, 24% $SiO_2$ and 14% $B_2O_3$ with a vitreous amorphous structure. The initially loose fibers with a length of about 3 mm and a diameter of 12 microns were firstly firmly secured to each other by the following method so that a stable and durable structure with a high porosity resulted.

(b) A part of the disk-like fiber member was treated in a CVD plant for six hours at a temperature of 800° C. with a gas made up of 8 mol % $BCl_3$, 9 mol % $NH_3$ with the remainder in the form of $H_2$, at an overall pressure of 10 kPa. The result was the deposition of amorphous boron nitride (BN) on the fibers with a layer thickness of approximately 2 microns. Following this, the process vessel was flushed with $N_2$ to free it of reactive gas mixture while the temperature was increased to 1100° C. When this temperature had been reached, the $N_2$ was replaced with air and air was passed over the fiber disks coated with BN for two hours. This oxidative treatment led to the formation of a boron oxide film on the BN which caused a firm sintering together of the fibers as linked by the BN.

EXAMPLE 6

As an alternative to example 5, the coating operation with BN was undertaken during a period of 3 hours at 1100° C. using 4 mol % $BBr_3$ and 5 mol % $NH_3$ in $H_2$ at 5 kPa overall pressure and the oxidative treatment then took place at the same temperature.

EXAMPLE 7

(a) The same starting material as in example 5 was impregnated in a further test series using the sol-gel method, in which the aim was to join or bond the initially loose fibers together in a material adapted in its composition to the fiber material (b) 4.4 moles of $Al(O-sec.C_4H_9)_3$ were added to a solution of 0.7 mole of tetraethyloxysilane (TEOS) and 0.7 mole TMOS in 3 l of i-$C_3H_7OH$ with vigorous agitation. 2 l of 0.35 mole/l $B(OCH_3)_3$ in i-$C_3H_7OH$ were added to this solution also with agitation and while heating. The disk-like prepared fiber bat mounted in metal gauze was dipped in the resulting clear sol. After complete impregnation the bat was removed from the bath, allowed to drain in normal air and lastly aspirated. A gel film had formed on the fibers. The excess material was drawn off. After drying in air at ambient temperature the coated fiber members were heated in stages rising to 900° C. with pauses of 2 hours between the heating steps at 70°, 200° and 600° C. After spending 2 hours at 900° C. cooling down took place. This thermal treatment caused the coating material to be firmly bonded to the fibers. The fiber coating had a vitreous amorphous crystalline structure, but there was a highly structured morphology. The fibers were firmly joined at the crossovers.

EXAMPLE 8

(a) Fiber tubes were produced by winding silicon carbide fibers with a diameter of approximately 12 microns using a multiple yarn eye runner. Cross winding took place onto perforated tubes with a metal gauze support. Accordingly care was taken to see that the fibers were wound just firmly enough to ensure that they might be handled without sliding. The wound fiber tubes, which as yet had to be gently handled, were bonded by coating with mullite ($Al_6Si_2O_{13}$) in the CVD method. The method for the coating of the SiC fibers with the oxide ceramic material was based on the methods described in examples 1 to 3 for $Al_2O_3$ coating, the deposition of the mixed oxide being caused by the suitable admixture of silicon tetrachloride ($SiC_4$) to the gas phase (made up of $AlCl_3$, $CO_2$ and $H_2$) used for the deposition of $Al_2O_3$. As regards the mullite composition there was in principle a slightly substoichoimetric quantity of $SiCl_4$ in order to prevent the release of free $SiO_2$.

(b) For the deposition a gas with the following composition was selected: 6.0 mol % $AlCl_3$, 1.8 mol % $SiCl_4$, 12,8 mol % $CO_2$, remainder $H_2$. The process parameters were same as in example 1, part (b). Then a subsequent heat treatment was carried out at 1000° C. for three hours in a forced air circulation furnace in order to complete the formation of the mullite phase. The result was a finely crystalline mullite coating on the SiC with a highly structured surface on the coating which securely united the fibers.

EXAMPLE 9

(a) The procedure was the same as in example 8 (a).

(b) The procedure was as in part (b) of the previous example but with a deposition period of 6 hours at 980° C. Under these conditions a somewhat coarser, but a more regular mullite coating resulted on the SiC fibers, which also led to a stabilized structural shape owing to the connection of the fibers.

EXAMPLE 10

(a) The same as in example 8, part (a).

(b) As in example 8 part (b) but with 5.4 mol % $AlCl_3$, 1.6 mol % $SiCl_4$, 10.5 mol % $CO_2$, remainder $H_2$ at an overall pressure of 100 kPa. Deposition took place at 1050° C. for 4 hours. A crystalline mullite coating with a high specific surface area was obtained on the SiC fibers which provided a stable connection between fibers of the wound fiber member.

EXAMPLE 11

Disk-like members were made from staple $Al_2O_3$ fibers in the form of bats. The fiber diameter was approximately 20 microns. The fibers in the disk-like members which were initially loosely felted had an average length of approximately 6 mm. They were joined together by coating in the gas phase with titanium dioxide ($TiO_2$) at the crossovers so that the result was a dimensionally stable and highly porous fiber member. The coating of the fiber structure with $TiO_2$ took place at a temperature of 800° C. in reactive gas phase of the composition: 10 mol % $TiCl_4$, 22 mol % $CO_2$ remainder $H_2$. The pressure was 10 kPa and the duration 5 hours. After deposition the fibers had a 3 to 5 micron thick coating of $TiO_2$ which on x-ray examination of the fine structure was seen to have only weakly developed reflections and accordingly was in a practically amorphous form.

Fiber bats produced in accordance with the invention may if desired be subjected to further treatment and as an example they may be used as catalyst supports. the following examples relate to the subsequent coating with catalytically active materials for the production of exhaust gas catalysts, more specially those for diesel engines.

EXAMPLE 12

Fiber bats as bonded (or stabilized) in accordance with examples 1 to 3 were coated with copper and vanadium oxide by chemical deposition from the gaseous phase.

To this end acetylacetonates of Cu and V were swept through the fiber members by an inert gas current (Ar or alternatively $N_2$), the members being at a temperature between 300° and 600° C. The acetylacetonates were present in concentrations of 0.1 to 2 mol % in the inert gas. The formation of the oxides by pyrolysis of the metal acetylacetonate was enhanced by the addition of minor amounts of water vapor (with partial pressures between 10 Pa and 1 kPa).

The fiber members (see FIG. 6) were placed in diesel exhaust gas to test them. It was found that there was a high catalytic efficiency which at the given exhaust gas temperatures led to a substantial burnoff of the soot particles with traces of hydrocarbons mixed with them. The high efficiency of the fiber filters coated with catalyst is to be attributed not only to the catalytic acceleration of the oxidation reaction owing to the copper vanadates, which are formed from the oxides of copper and of vanadium deposited from the decomposing acetylacetonates, but also the large surface area of the fiber structure, which is additionally increased by the coated $Al_2O_3$ and its action as an active intermediate layer or "wash coat". There was a longer working life of the filter as compared with filters which had not been subsequently coated.

EXAMPLE 13

For coating the bonded fiber bat as produced in example 4 with an oxidation catalyst the impregnating method was utilized. The bonded fiber members were dipped in a diluted alcoholic solution of europium triethylate and cobalt nitrate (each 0.01 mole in i-$C_3H_7OH$). The members were then aspirated and dried in the air. After this they were slowly heated to 600° C. in a furnace with forced air circulation, kept for two hours at this temperature and finally heated for half an hour at 900° C. The result was a coating of $EuCoO_3$ in the form of fine agglomerates of submicroscopic crystals embedded in the $Al_6Si_2O_{12}$ structure.

In an exhaust gas test an effect was achieved which was comparable with that obtained with the test filters described in examples 1 to 3 and 12. Once again the efficiency was to be attributed to the combination of the properties of the bonded or stabilized fiber structure and the catalytic properties.

EXAMPLE 14

In a supplementary series of tests the composition of the catalytic coating was modified without changing the method producing the fiber filter as in example 4. The fiber structure was coated with the mixed oxides $SmCoO_3$, $EuCrO_3$, $EuMnO_3$, $CeCoO_3$, $CeCrO_3$, $CeMnO_3$ and $SmFeO_3$. Such treated structures were in principle found to be suitable for catalyzing the oxidation of soot.

Furthermore the fiber members bonded with BN and $B_2O_3$ as in examples 5 or 6 were coated for use in diesel exhaust gas filters with oxidation catalysts. $TiO_2$ was used as an active intermediate layer. For producing the coating thereon the methods of examples 15 and 16 were used.

EXAMPLE 15

Firstly a part of the fiber member was only provided with the $TiO_2$ intermediate layer, as described in what follows and then in a separate process the catalyst was applied thereto.

96% ethanol was added to a solution of 2 molar tetraethyl titanate ($Ti(OC_2H_5)_4$) in i-$C_3H_7OH$ so that there was a ratio of the ethanol to isopropanol of 1 to 10. Vigorous agitation took place and the fiber members were dipped into this mixture. After draining and drying in air at the ambient temperature the coated fiber members were heated in four stages at 70°, 200° and 600° to 900° C. with two hour pauses between each stage. After holding for 2 hours at 900° C. cooling took place. This treatment led to a strong and firmly adhering intermediate layer of $TiO_2$ with a large surface area. Fiber members provided with the amorphous $TiO_2$ intermediate layer were treated with the method as in example 13 to apply the catalysts to them.

EXAMPLE 16

0.02 molar $Mn(NO_3)_2$ and the same amount of $Co(NO_3)_3$ were added to the basic $Ti(OC_2H_5)_4$ solution as described in example 15. The further operation was as indicated in example 15 for the production of the $TiO_2$ intermediate layer. The result was a firmly adhering, catalytically active coating, in which the catalyst was well integrated into the support or carrier layer. In addition to the $TiO_2$ different mixed oxide phases may be formed, which however it was not possible to identify owing to the amorphous character of the coating.

The filter coatings, both produced in accordance with example 15 and also those of example 16, were characterized by a particular chemical stability under the conditions of use of the filter, in addition to the catalytic activity.

EXAMPLE 17

(a) The fiber bat as in example 7 was used as a catalyst support. The production of a catalytic coating followed the same principles as in the examples 15 and 16, that is to say (i) in the case of some of the fiber members firstly a separate intermediate layer was applied before the catalyst as such was put on and (ii) in the case of a second part the intermediate coating material and the catalytic material were applied jointly in one process step.

(b) The bonded fiber members were impregnated with a respectively 0.1 molar solution of titanium(IV) ethylate $(Ti(OC_2H_5)_4)$ and cerium(IV) ispropylate $(Ce(i-OC_3H_7)_4$ in isopropanol, to which 10% by weight of ammonaical ethanol had been added directly beforehand. The excess Ti/Ce sol was allowed to drain off and the moist fiber members were exposed to the air for one hour. After this the fiber members were heat treated as in example 15. Then in a further process step fiber shapes provided with the finely disperse mixture of $TiO_2$ and $CeO_2$ were impregnated with respective 0.01 molar aqueous solutions of copper(II) and NI(II) hexanoate, $(Cu(C_5H_{11}CO_2)_2$ and $Ni(C_5H_{11}CO_2)_2)$. Immediately before the impregnation 1% by weight of 0.01 molar aqueous ammonium hydroxide solution was added to the respective solution. The impregnation solution was heated with the fiber members to 60°–70° C.

(c) When this temperature was reached the fiber members were removed from the impregnating solution, allowed to drain and slowly heated up to 500° C. within a period of 4 hours. They were then heated for 2 hours at this temperature. The result was a highly disperse coating of CuO and NiO firmly adhering to the $TiO_2/CeO_2$ intermediate layer.

(d) Testing was carried out with a diesel engine and it was found that these fiber products were very satisfactory as filters and catalysts for soot combustion owing to the specific properties that have been described.

(e) The second part of the fiber shapes bonded with $Al_2O_3/SiO_2/B_2O_3$ was impregnated with a solution of 0.1 molar $Ti(OC_2H_5)_4$, 0.1 molar $Ce(i-OC_3H_7)_4$, 0.005 molar $Cu((C_5H_{11}CO_2)_2$ and 0.005 molar $Ni(C_5H_{11}CO_2)_2$ in $1-C_3H_7OH$, directly after the addition of 10% by weight of 0.01 molar aqueous ammonium hydroxide solution. After removal from the colloidal solution the members were drained and then aspirated. The fiber members as freed from excess sol were allowed to stand for approximately 12 hours for the formation of gel on the fibers. Then the members were heated in 2 hour stages at 70°, 180° and 400° C. up to 800° C. with 2 hour. They were kept for 3 hours at the final temperature. The impregnated fiber members were cooled down in the furnace to room temperature.

(d) This treatment as well led to a coating with the desired properties and the effect of the fiber filters was comparable with that obtained in example 17, part (b), as was shown in tests when filtering exhaust gas.

EXAMPLE 18

The fiber shapes as produced in examples 8 to 10 were provided with a catalytic coating as in the preceding examples on the mullite intermediate layers prior to testing their efficiency as regards filtration on an engine exhaust gas test bench.

For this purpose the fiber members were impregnated in a colloidally dispersed solution of 2 molar titanium oxide hydrate, which additionally contained 0.1 molar $MnCl_2$, then dried and finally calcined at 500° C. in an $H_2$ current. The result was a $(Ti,Mn)O_2$ mixed oxide layer. Fiber filter members provided with such a layer had a high efficiency as regards filtration and soot burn-off in diesel exhaust gas systems.

EXAMPLE 19

A fiber bat as produced in example 11 was coated in the following manner with a catalyst for the oxidation of soot and hydrocarbons. It was to be seen that owing to the $TiO_2$ deposited to bond the fibers together at their crossovers, the catalyst was able to be directly applied without an intermediate layer. For the catalytic coating at a temperature of 500° C. an argon carrier gas current containing 1 mol % molybdenum carbonyl, $Mo(CO)_6$, and 0.5 mol % dimanganese decacarbonyl, $Mn_2(CO)_{10}$, was caused to pass through the fiber structures. After deposition for half an hour the result was a blue-black, firmly adhering coating of a non-stoichiometric molybdenum oxide, $MoO_{3-x}$ and manganese oxide in a highly dispersed form. Filtration tests showed that there was a high efficiency as regards retention of particles and the combustion of carbon and hydrocarbons. A further characteristic of this version of the fiber filter was that there was a very low back pressure.

What is claimed is:

1. A method for the manufacture of a fiber bat in the form of a felt-like structure comprising the steps of placing fibers in an array constituting a bat and then so coating the fibers in the bat with a bonding material that the fibers are substantially exclusively joined with each other at crossovers thereof, the fibers in the bat being made of a material selected from the group consisting of $Al_2O_3$, mullite, $SiO_2$, $B_2O_3$, SiC and combinations thereof, said bonding material being selected from the group consisting of $Al_2O_3$, $B_2O_3$, SiC, $ZrO_2$, BN, $TiO_2$ and mullite.

2. The method as claimed in claim 1 wherein said fibers while in said bat are coated by a CVD method.

3. The method as claimed in claim 1 wherein said fiber bat is coated by the deposition of coating material from a liquid phase.

4. The method as claimed in claim 3 comprising the steps of impregnating the fiber bat with a solution, precipitating coating material from the solution and firing said fibers with said precipitated material thereon.

5. The method as claimed in claim 3 wherein an amorphous coating is deposited on the fibers in a sol-gel method.

6. The method as claimed in claim 1 comprising interrupting the coating operation at least once to encourage the formation of nuclei for renewed deposition.

7. A soot filter comprising of a bat with intersecting fibers which are bonded to each other by a refractory bonding material substantially exclusively at crossovers thereof, the fibers in the bat being made of a material selected from the group consisting of $Al_2O_3$, mullite, $SiO_2$, $B_2O_3$, SiC and combinations thereof, said bonding material being selected from the group consisting of $Al_2O_3$, $B_2O_3$, SiC, $ZrO_2$, BN, TiO and mullite.

* * * * *

UNITED STATES PATENT AND TRADEMARK OFFICE
CERTIFICATE OF CORRECTION

PATENT NO. : 4,761,323
DATED : August 2, 1988
INVENTOR(S) : Muhlratzer et. al.

It is certified that error appears in the above-identified patent and that said Letters Patent is hereby corrected as shown below:

Title page:

The correct name of the assignee is :

-- MAN Technologie GmbH --

Signed and Sealed this

Fourteenth Day of November, 1989

*Attest:*

JEFFREY M. SAMUELS

*Attesting Officer*     *Acting Commissioner of Patents and Trademarks*